Oct. 16, 1945.   J. DAUGHERTY   2,387,012
TOOL LIFTER FOR MACHINE TOOLS
Filed April 26, 1944   2 Sheets-Sheet 1
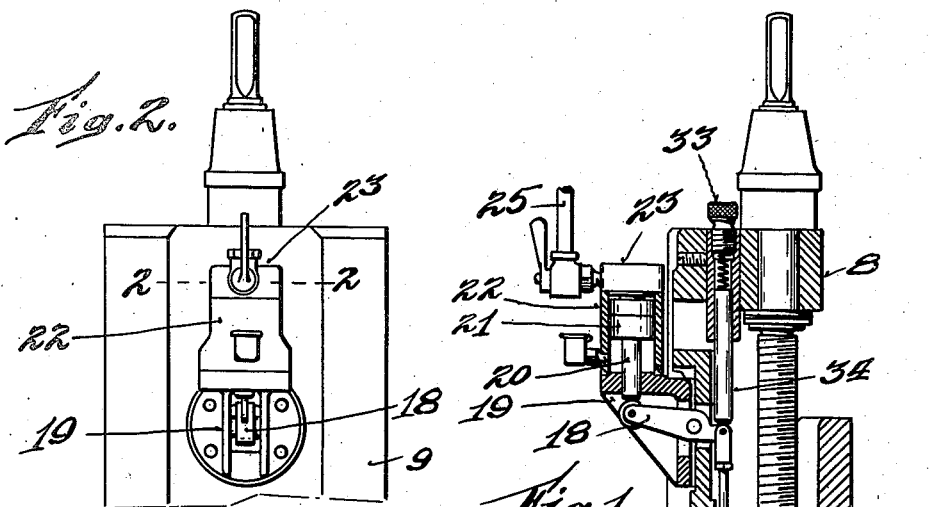
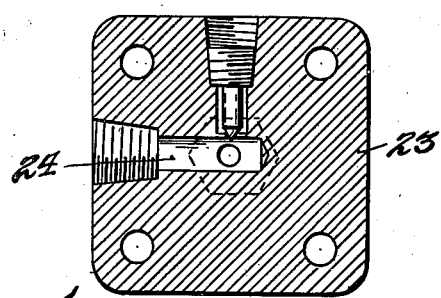
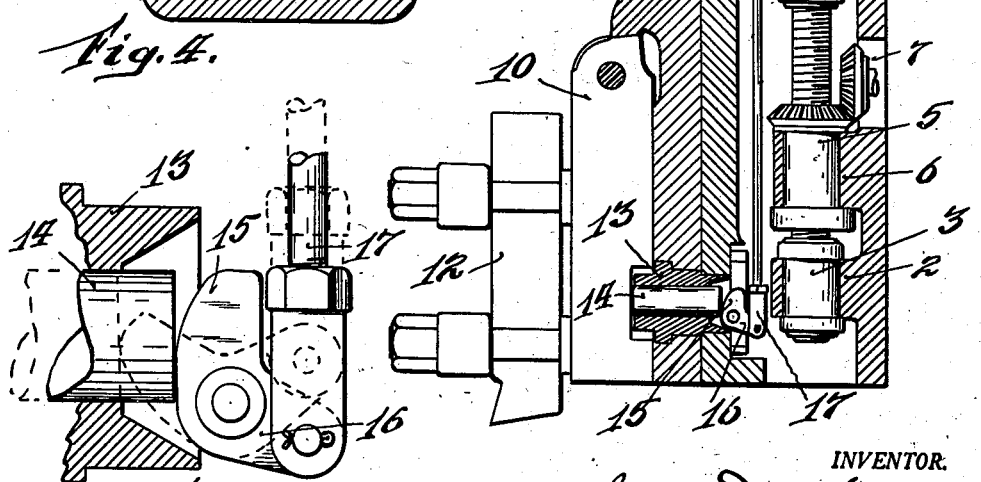
INVENTOR.
Jesse Daugherty
BY
Oliver B. Kaiser
Atty.

Oct. 16, 1945.   J. DAUGHERTY   2,387,012
TOOL LIFTER FOR MACHINE TOOLS
Filed April 26, 1944   2 Sheets-Sheet 2
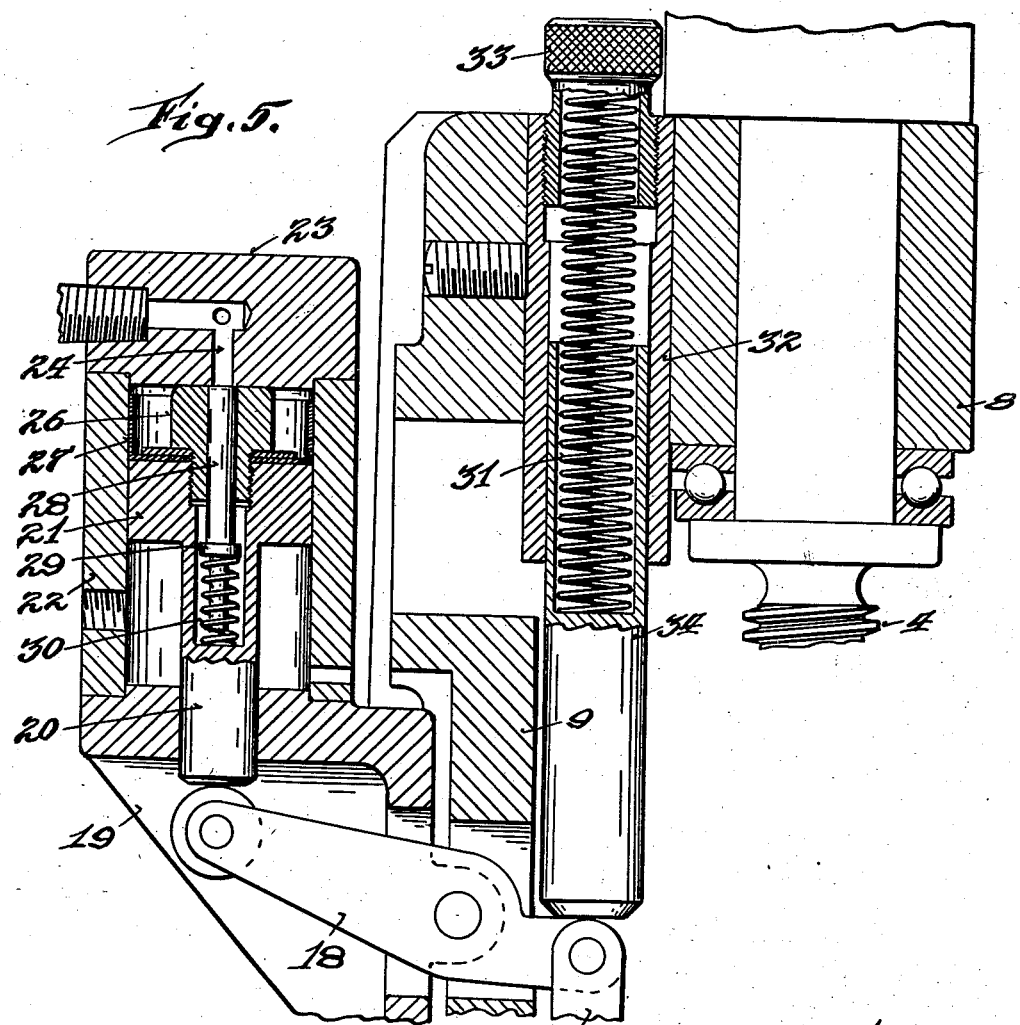
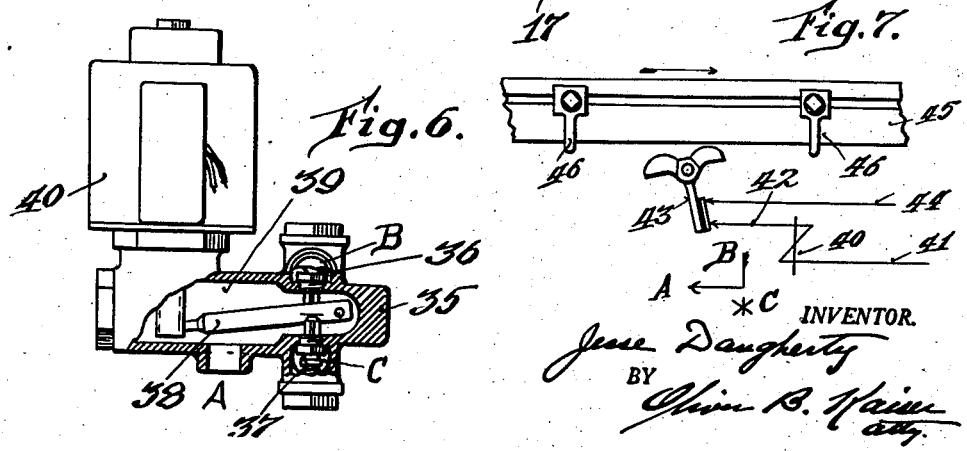
INVENTOR.
Jesse Daugherty
BY Patented Oct. 16, 1945

2,387,012

UNITED STATES PATENT OFFICE 2,387,012

TOOL LIFTER FOR MACHINE TOOLS

Jesse Daugherty, Cincinnati, Ohio, assignor to The Cincinnati Planer Company, Cincinnati, Ohio, a corporation of Ohio Application April 26, 1944, Serial No. 532,901

6 Claims. (Cl. 90—55)

This invention relates to improvements in cutting tool lifters for machine tools, exemplified in a metal planer and particularly wherein the cutting tools are of considerable size and weight, to move the cutting tool or tools away from the contact with the work in and for the return or reverse stroke of the work fixed upon a reciprocable work holding table or carriage to avoid injury to either the tool or work.

An object of the invention is to provide power-operated means of simple construction, mounted within the tool carrying head of a planer or other machine tool and embodying a plunger in engagement with the rear side of a swinging tool holder to positively actuate and maintain the holder to a position at which the cutting edge of the tool or tools sustained upon the holder are out of contact or free from the work in one stroke or direction of travel of a reciprocating work holding table or carriage and controlled by the work holding table in its travel.

Various other features and advantages of the invention will be more fully set forth in the following description of the accompanying drawings forming a part of this specification, in which:

Figure 1 is a central vertical section through a tool carrying head of a metal planer embodying the improved tool lifter.

Figure 2 is a front elevation of the head end of the tool carrying head.

Figure 3 is an enlarged side view of one end of the link and lever means for actuating a plunger abuttingly engaging the rear side of a swinging tool carrying holder.

Figure 4 is an enlarged section on line 2—2, Figure 2.

Figure 5 is an enlarged central section of the head end of the tool carrying head corresponding to Figure 1.

Figure 6 is a side elevation, partly in section of a three-way solenoid operated valve.

Figure 7 is a diagrammatic view of a control circuit for the solenoid operated valve.

In the drawings no disclosure is made of a complete machine tool, as for example, a planer, to which the present improvement is particularly applicable, as it may be of conventional structure, well known in the art.

Generally in a planer type of machine tool the work is dogged or clamped upon a traversing table and moved against a relatively fixed tool. The table generally is disposed and reciprocates in a horizontal plane upon a bed. The cutter usually is active in one traversing stroke of the work and idle in a reverse or return stroke of the work.

The tool is carried by a head slidable upon a cross rail, which in turn is slidable or movable upon vertical slide ways each respectively on a vertical housing or upright extending upwardly above the bed of the machine and relatively at opposite side thereof. The cross rail thus is supported by a pair of uprights and bridges the work, and the larger sizes of planers generally carry a pair of tool carrying heads. It is also common practice to provide side heads for either one or both of the housings or uprights.

As the present improvement is incorporated in a tool carrying head of a planer and as the structure is duplicated for each head the disclosure is confined to a single head.

Referring to the drawings, the tool carrying head comprises a slide rest 1, commonly called a harp and following the conventional practice is mounted upon a saddle, not shown, which in turn is mounted and translated upon the cross rail of the planer. The harp is provided with a pair of bearings 2, 2, each respectively non-rotatively sustaining a nut 3, in threaded engagement with a feed screw 4, traversing the nuts. The screw 4, is revolved by a bevel gear 5, having its hub journaled in a bearing 6, integral with the rest. The gear 5, is keyed to the feed screw 4, and the key is engaged in a spline longitudinally of the feed screw. The feed screw is rotated by suitable gear transmission of which gear 7, is an element in mesh with gear 5, and manually by crank handle engageable upon the outer end of the screw.

The upper or outer end of the feed screw 4, traverses and is journaled in a bearing 8, extending from the rear side of a slide 9, slidably mounted upon the harp 1.

The slide 9, carries a tool block 10, pivotally mounted at its upper end upon a clapper box 11, swiveled and clamped to the face side of the slide. The tool block 10, is pivotally mounted in the clapper box 11, to swing outwardly therefrom, thereby to elevate or move the cutting edge of the tool 12, away from the work.

The clapper box 11, for the tool block, is pivotally connected to the slide by a bushing or sleeve 13, fixed to the slide and is axially traversed by a plunger 14, of the tool lift mechanism. The outer end of the plunger 14, abuttingly engages or contacts against the rear side of the swinging block of the tool holder, and centrally thereof, adapting the plunger when moved outwardly to correspondingly swing the tool block to lift the cutting edge of the tool from the work. Extending the plunger through the axis of the clapper box permits the tool block 10, to be moved for tool elevation, in any angularly adjusted position of the clapper box.

The rear end of the plunger 14, is engaged by a cam-shaped edge of an arm 15, of a bell crank lever 16, pivotally mounted upon the rear side of the slide. The cam form of lever arm in an abutting contact with the rear end of the plunger provides for a loose connection of the parts, the arm in an outward arc of movement slides over the engaged surface of the plunger, whereby its action is compounded and is very effective in forcibly moving the plunger.

The curved cam edge of the lever arm is generated with a relatively long radius as compared to the radius of the swing of the lever, therefore is exceedingly smooth in its operation against the plunger. The construction facilitates assembly, is compact, requiring but a minimum space and is quickly responsive. The cam provides approximately uniformly accelerated motion in the lifting movement and uniformly decelerated motion of the tool block in the return movement or drop of the tool block. The lever ratio of the cam provides maximum force where needed which is when unseating the tool block. The shape of the cam also, by slowing down the falling movement of the tool block, causes the block to seat gently with a minimum effect in disturbing the position of the slide.

The second arm of the lever 16, pivotally connects with one end of a link or connecting rod 17, and the opposite end of the rod 17, pivotally connects with an arm of a lever 18, engaged through an aperture in the slide and pivotally mounted upon a bracket 19, fixed to the face side of the slide and at the upper or outer end thereof.

The opposite arm of the lever 18, journals a roller engaging with the end of a piston rod 20, extending from one side of a piston 21, reciprocable within a vertically disposed cylinder 22, mounted upon the bracket 19, the bracket providing a head for the cylinder.

A head 23 provides a closure for the upper end of the cylinder and has a duct 24 internally thereof leading centrally into the cylinder and communicates with a pressure supply pipe 25, engaged and threaded in a side of the head. The pressure supply line or pipe 25 leads to and connects with a suitable pressure source, which includes a valve stationed on the head 23, and the pressure medium may comprise either air or liquid as available. A portion of the pressure line, at the end connecting with the cylinder, may be of flexible tubing to accommodate for the vertical travel of the cross rail, cross feed of the tool carrying head and vertical feed of the slide.

A sleeve screw 26 is engaged centrally into the outer side of the piston, which serves to clamp the cup form of packing 27, to the piston and as a stop for engagement with the cylinder head 23, in the retreat or return stroke of the piston. The sleeve screw 26 is traversed by the shank or stem of a check valve 28, which normally caps the duct 24.

The valve extends into a socket axially of the piston rod 20, and is provided with an annular flange 29, engaging an end of a spring 30, seated against the base of the socket in the piston rod, for urging the valve against the cylinder head 23, to cap the duct 24. The seating end of the valve has a channel or groove cut across its face to prevent an absolute closure of the duct and provide a vent or escape of the pressure medium from the cylinder. The valve is employed to retard and cushion the movement of the piston for a determined distance toward the end of its return or retreat stroke, and thereby prevent any abrupt or sharp clap of the tool to its active or cutting position. The slow escape of the pressure medium from the cylinder checks the movement of the piston, cushioning the seating of the tool block, so as not to disturb the setting of the slide. The setting of the slide must be absolutely maintained, as a change as slight as .0001" would, if repeated each cutting stroke, cause a considerable error from machining a true plane.

The lifting mechanism is normalized by the pressure of a spring 31, housed within a guide sleeve 32, engaged and fixed within the upper end of the slide. One end of the spring 31 is socketed within a screw 33, threaded into the outer end of the sleeve 32, and its opposite end is socketed axially within a relative end of a plunger 34, slidable within the sleeve 32. The outer end of the plunger 34 bears against the outer end of the lever 18. The plunger 34 is located in longitudinal alignment with the connecting rod 17, and normalizes the lifting mechanism when the pressure against the piston is cut off. The tension of the spring can be regulated by adjusting the set screw 33.

Various methods may be employed for controlling and timing the operation of the lifting mechanism, relative to various lengths of traverse of the work or work carrying table. A preferred method comprises the use of a conventional three-way solenoid operated valve 35, interposed in the pressure line 25, to the piston cylinder 22. As illustrated in Figure 6, the valve is provided with a pair of oppositely disposed spring urged valves 36, 37, operative relatively alternately, that is when one is closed the other is open, and vice versa. The valves are actuated in an opening direction by a lever 38, disposed longitudinally within a chamber 39, of the valve casing and operated by a solenoid 40, mounted upon the valve casing. The lever 38 is interposed between the stems of the valves 36, 37, and in contact connection therewith.

The chamber 39 has a pressure inlet port B, controlled by the valve 36, a second port A in pipe connection with the cylinder 22, and an exhaust port C, controlled by the valve 37. When the valve 36 is open, upon energization of the solenoid, pressure is supplied to the cylinder for moving the piston to elevate the cutting tool from the work. The cutting tool is held in its elevated position until the control of the valve is reversed, whereby the pressure is cut off to the cylinder, that is valve 36, is closed and valve 37, opened permitting the pressure in the cylinder to exhaust for a return movement of the piston under the pressure of the spring 31.

One pole of the solenoid 40, as diagramed in Figure 7, connects with an electric power source line 41, while the opposite pole of the solenoid by a wire 42, connects with an electric switch carried by an arm of a lever 43, and through the switch, when closed, with a circuit line 44, connecting with the opposite line of a power source. The switch lever 43, is suitably mounted in relation to the traversing work carrying table 45, of the planer or machine tool and is actuated in alternate directions by a pair of dogs 46, 46, fixed at a predetermined distance apart to a side of the work carrying table 45. The dogs are adjustably mounted upon the side of the table to accommodate for different settings governed by the stroke length or travel of the table, which is variable. One of the dogs, say when the table has reached the end of a cutting stroke advancely actuates the switch lever to complete the electric circuit to energize the solenoid and effect a lifting of the cutting tool from the work, and which is held energized to hold the cutting tool from the work until the end of the return stroke of the work holding table is reached, whereupon the second dog moves the switch lever in a reverse position, to break the electric circuit to the solenoid. It is preferable to have the control setting arranged so that the tool is lifted immediately upon reaching the end of the cutting travel and in advance of the table starting on its return stroke and this follows correspondingly alternately in a forward or cutting stroke.

The electric circuit control for the solenoid operated valve is disclosed in a simplified form, may be variously modified and may be regarded as separate from the tool lifting mechanism and is merely exemplified to show a complete and concise method of operation. The valve 36, is shown as unseated when the solenoid is energized, which may be the better practice, for the unseating force is against the pressure supply, which must be overcome. To arrange the unseating force against the pressure supply prevents the incidental application of pressure at the wrong moment, which may be due to failure of a part.

In an operation of the lifter, the dogs 46, 46 are appropriately set, gauged by the length of traverse of the work holding table, necessary for machining a given piece of work mounted upon the table, so that the tool lifting control is effective at an interval following the cutting tool clearing the work and before the traverse of the table is reversed. This correspondingly follows for either direction of table traverse.

Thus when a dog 46, toward the end of the table traverse trips the switch lever 43, by engagement with one of the pair of butterfly cams of the lever 43, say for lifting the tool, the switch lever is moved in a direction to close or complete an electric circuit for energizing the solenoid 40, operating the valve 35, for supplying air pressure to the cylinder 22, thereby moving the piston 21, forward and through the link and lever mechanism connecting with the piston lifting the tool block 10.

The switch lever 43, is alternately brought into and out of contact at the end of each table stroke by means of the dogs 46. The switch lever 43, however, can be provided with two relatively offset butterfly cams, each of which is rocked by the corresponding of the relatively offset dogs 46, causing the table traverse to stop and reverse immediately upon depression of either one of the cams.

With the forward movement of the piston, the cam arm 15, moves the plunger 14, correspondingly lifting the tool block 10. The profile of the cam arm 15, provides approximately uniformly accelerated motion in the lifting movement and corresponding uniformly decelerated movement of the tool block in its drop. The cam arm 15, at the end of a tool lifting swing has its tip end in engagement with the plunger 14, thereby is self-locking, so as to prevent damage through failure of operation of any part of the lifting mechanism. The shape of the cam of the arm 15, and the checking of the movement of the piston by the check valve 28, in its control of the exhaust from the cylinder, combine to prevent any abrupt seating of the tool block.

As the tension of the spring 31, is regulatable by the screw 33, the normalizing pressure upon the lifting mechanism may be varied to compensate for variation in manufacture and the weight of different sizes of tools as a further accommodation for a smooth and efficient operation of the mechanism.

The power cylinder is preferably mounted upon the front and top end of the slide as a convenient location for ready accessibility for making repairs as in replacement of the packing and spring for the check valve.

Having described my invention, I claim:

1. A tool lifter for a tool sustaining head of a machine tool embodying a slide, a tool holder hingedly mounted upon the slide, a plunger carried by the slide having an end engaging the tool holder to swing the same to clear its cutting tool from the work mounted upon a traversing support, a lever mounted within the slide having a crank arm provided with a curved edge for sliding engagement with the inner end of said plunger, a link longitudinally of the slide having one end connecting with said lever, a second lever on said slide connecting with the opposite end of said link and pressure operated means operatively connecting with said second lever.

2. A tool lifter for a tool sustaining head of a machine tool embodying a slide, a tool holder hingedly mounted upon the slide, a plunger carried by the slide having an end engaging the tool holder to swing the same to clear its cutting tool from the work mounted upon a traversing support, a lever mounted within the slide having a crank arm provided with a curved edge for sliding engagement with the inner end of said plunger, the curved edge of said crank arm generated with a relative long radius as compared to the radius of swing of the lever, a link longitudinally of the slide having one end connecting with said lever, a second lever on said slide connecting with the opposite end of said link and pressure operated means operatively connecting with said second lever.

3. A tool lifter for a tool sustaining head of a machine tool embodying a slide, a tool holder hingedly mounted upon the slide, a plunger carried by the slide having an end engaging the tool holder to swing the same to clear its cutting tool from the work mounted upon a traversing support, a lever mounted within the slide having a crank arm provided with a curved edge for sliding engagement with the inner end of said plunger, the curved edge of said crank arm generated with a relative long radius as compared to radius of swing of the lever, a link longitudinally of the slide having one end connecting with said lever, a second lever on said slide connecting with the opposite end of said link, pressure operated means operatively connecting with said second lever and tension means within the slide for normalizing said movable parts upon release of the pressure to said pressure operated means.

4. A tool lifter for a tool sustaining head of a machine tool embodying a slide, a tool holder hingedly mounted upon a slide, a plunger carried by the slide having an end engaging the tool holder to swing the same to clear its cutting tool from the work mounted upon a traversing support, a lever mounted within the slide having a crank arm provided with a curved edge for sliding engagement with the inner end of said plunger, the curved edge of said crank arm generated with a relative long radius as compared to the radius of swing of the lever, a link longitudinally of the slide having one end connecting with said lever, a second lever on said slide connecting with the opposite end of said link, pressure operated means operatively connecting with said second lever, and a spring urged plunger within said slide coaxially with said link and in engagement with one end thereof for normalizing said movable parts upon release of the pressure to said pressure actuated means.

5. A tool lifter for a tool sustaining head of a machine tool embodying a slide, a tool holder mounted on said slide and hingedly movable to swing the same to clear its cutting tool from the work mounted upon a traversing support, link and lever means mounted on said slide for swinging said tool holder, a cylinder mounted on said slide having a piston reciprocable therein, providing a pressure operated means for actuating said link and lever means to lift the holder, spring urged means for normalizing said piston and link and lever means upon release of the pressure to said cylinder and a spring urged check valve carried by the piston for controlling the pressure exhaust from the cylinder toward the end of the return stroke of the piston to retard the normalizing movement.

6. A tool lifter for a tool sustaining head of a machine tool embodying a slide, a tool holder hingedly mounted on said slide, a plunger carried by the slide having an end thereof in abutting engagement with the tool holder to swing the same, to clear its cutting tool from the work, link and lever means mounted on said slide for actuating said plunger, the lever having a crank arm provided with a curved edge for a sliding engagement with the inner end of the plunger, to decelerate plunger and holder movement to seat the holder without shock, a cylinder mounted on said slide having a piston reciprocable therein providing pressure operated means for actuating said link and lever, spring urged means for normalizing said piston and link and lever means upon release of the pressure to said cylinder and a spring urged check valve carried by the piston for controlling the pressure exhaust from the cylinder toward the end of the return stroke of the piston to retard the normalizing movement.

JESSE DAUGHERTY.